US010311136B2

(12) United States Patent
Megiddo et al.

(10) Patent No.: US 10,311,136 B2
(45) Date of Patent: Jun. 4, 2019

(54) REALLY SIMPLE SYNDICATION FOR DATA (75) Inventors: Eran Megiddo, Bellevue, WA (US); Shahar Prish, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1069 days.

(21) Appl. No.: 11/609,184

(22) Filed: Dec. 11, 2006

(65) Prior Publication Data
US 2008/0141113 A1 Jun. 12, 2008

(51) Int. Cl.
*G06F 17/22* (2006.01)
*G06F 16/958* (2019.01)

(52) U.S. Cl.
CPC ........ *G06F 17/2247* (2013.01); *G06F 16/972* (2019.01)

(58) Field of Classification Search
CPC . G06F 17/2247; G06F 17/30893; G06F 17/30
USPC ........... 715/234, 237; 707/E17.117; 709/223
See application file for complete search history.

(56) References Cited

U.S. PATENT DOCUMENTS

| 5,926,822 | A | 7/1999 | Garman | |
| 6,502,101 | B1* | 12/2002 | Verprauskus et al. | 707/101 |
| 6,732,102 | B1* | 5/2004 | Khandekar | |
| 6,842,737 | B1 | 1/2005 | Stiles et al. | 705/6 |
| 6,963,930 | B2* | 11/2005 | Halpert | G06F 17/3089 707/E17.116 |
| 6,976,010 | B2 | 12/2005 | Banerjee et al. | 705/51 |
| 7,007,033 | B1* | 2/2006 | Rothschiller et al. | 715/705 |
| 7,069,318 | B2 | 6/2006 | Burbeck et al. | 709/224 |
| 7,523,137 | B2* | 4/2009 | Kass et al. | 707/999.101 |
| 7,581,166 | B2* | 8/2009 | Renger et al. | 715/201 |
| 7,584,268 | B2* | 9/2009 | Kraus | G06F 17/24 709/204 |
| 7,590,649 | B2* | 9/2009 | Tischer | 707/102 |
| 8,244,796 | B1* | 8/2012 | James | G06Q 10/10 709/203 |
| 2005/0091220 | A1* | 4/2005 | Klemow | G06F 17/3089 |

(Continued)

FOREIGN PATENT DOCUMENTS

| JP | 2010-512602 A | 4/2010 |
| WO | WO 02/07013 A2 | 1/2002 |

(Continued)

OTHER PUBLICATIONS

Lenhart, A. et al., "Bloggers—A Portrait of the Internets New Storytellers", *Pew/Internet & American Life Project*, Jul. 19, 2006, http://www.pewinternet.org, 33 pages.

(Continued)

*Primary Examiner* — Manglesh M Patel
*Assistant Examiner* — Nicholas Hasty
(74) *Attorney, Agent, or Firm* — BakerHostetler (57) ABSTRACT

Really Simple Syndication (RSS) is extended to syndicate structured data as well as general content via Really Simple Syndication for data (RSSd). RSSd provides a mechanism by which tables of data can easily be made available to users and across applications. RSSd provides the ability to syndicate data directly into applications, such as spread sheet applications. RSSd is backwards compatible with RSS. Standardized metadata is utilized in each element of RSSd to enable typing of data.

16 Claims, 9 Drawing Sheets

| | Element | Parent Element | Description | Example |
|---|---|---|---|---|
| 30 → | rssd:id | rssd:column | Mandatory<br>This contains the id of the column. | \<rssd:id\><br>stock_value<br>\</rssd:id\> |
| 32 → | rssd:title | rssd:column | Optional<br>Contains the title for the column | \<rssd:title\><br>Stock Value<br>\</rssd:title\> |
| 34 → | rssd:description | rssd:column | Optional<br>Contains the description for this column. | \<rssd:description\><br>This column contains the value of the stock.<br>\</rssd:description\> |
| 36 → | rssd:guid | rssd:column | Optional,<br>Multiple occurrences | |
| 38 → | rssd:altid | rssd:column | Optional,<br>Multiple occurrences | |

(56) References Cited

U.S. PATENT DOCUMENTS

| | | | |
|---|---|---|---|
| 2005/0165615 A1 | 7/2005 | Minar | 705/1 |
| 2005/0289147 A1 | 12/2005 | Kahn et al. | 707/10 |
| 2006/0073812 A1* | 4/2006 | Punaganti Venkata et al. | 455/412.1 |
| 2006/0085750 A1 | 4/2006 | Easton et al. | |
| 2006/0129917 A1* | 6/2006 | Volk | G06F 17/2247 715/201 |
| 2006/0173985 A1 | 8/2006 | Moore | 709/223 |
| 2006/0198208 A1* | 9/2006 | Witchey et al. | 365/189.05 |
| 2006/0206803 A1 | 9/2006 | Smith | 715/513 |
| 2006/0230021 A1* | 10/2006 | Diab et al. | 707/3 |
| 2006/0265489 A1* | 11/2006 | Moore | H04L 67/1095 709/223 |
| 2006/0287989 A1* | 12/2006 | Glance | G06F 17/30587 |
| 2007/0094156 A1* | 4/2007 | Isaacs | G06F 9/451 706/2 |
| 2007/0234211 A1* | 10/2007 | Henderson | G06F 17/30893 715/700 |
| 2007/0294366 A1* | 12/2007 | Ozzie | G06F 17/30578 709/217 |
| 2008/0141113 A1 | 6/2008 | Megiddo et al. | |

FOREIGN PATENT DOCUMENTS

| | | |
|---|---|---|
| WO | WO 05/089336 A2 | 9/2005 |
| WO | 2008/073659 A1 | 6/2008 |

OTHER PUBLICATIONS

"Emerging Media Series: How Blogs and Real Simple Syndication (RSS) Impact B2B Technology Purchase Decisions", CRM Buyer™, The Essential Guide for CRM System Purchasers, Published Sep. 8, 2006, *Analyst Report*, Downloaded from Internet Oct. 9, 2006, http://resources.crmbuyer.com, 3 pages.

"RSS for the Enterprise: A Primer", 2005, KnowNow Inc., http://www.knownow.com, 3 pages.

Chandrashekar A: "Syndicating Qualified Master Data Fields", Apr. 19, 2006, pp. 1-7, XP002665887, Retrieved from the Internet: URL:http://www.sdn.sap.com/irj/scn/go/portal/prtroot/docs/library/uuid/792f57b7-0a01-0010-f3b6-881269136a83?QuickLink=index &overridelayout=true [retrieved on Dec. 16, 2011].

Hammond, T. et al.: "The Role of RSS in Science Publishing: Syndication and Annotation on the Web", Jan. 12, 2006, XP002665888, Retrieved from the Internet: URL:http://nurture.nature.com/tony/docs/D1ibPaper_new.doc [retrieved on Dec. 16, 2011].

Notice of Rejection for Japanese Patent Application No. 2009-541446, dated Jul. 13, 2012, 3 pages.

Kazuto Aso, "What's RSS?," Nikkei Network, No. 67, pp. 68-79, Nikkei Business Publications, Inc., Japan, Oct. 22, 2005.

"Office Action Received in Japan Patent Application No. 2009-541446", dated May 27, 2014, Filed Date: Nov. 9, 2007, 5 Pages.

"Search Report and Office Action Received in Taiwan Patent Application No. 96147105", dated Nov. 7, 2013, Filed Date: Dec. 10, 2007, 9 Pages. (Only Search report in English Translation).

"Office Action Received in Korea Patent Application No. 10-2009-7014249", dated Feb. 24, 2014, Filed Date: Nov. 9, 2007, 14 Pages.

Indian Patent Application No. 4548/DELNP/2009; Office Action; dated Mar. 31, 2017; 7 pages.

"Notice of Allowance Received for Japan Patent Application No. 2009-541446", dated Jun. 24, 2014, Filed Date: Nov. 9, 2007, 4 Pages.

"Advanced techniques of Excel" featured in Windows 100% published on Dec. 1, 2004, by Fuyusha, Co., Ltd., pp. 42-47, No. 12, vol. 7 [Includes partial English translation]

The buzz of web, RSS/TrackBack on Windows ~ Theory and Implementation of RSS/TrackBack ~ authored by Fumitaka Ohsawa and printed in dotNET Magazine published on Apr. 1, 2005 by Shoeisha Co., Ltd. Japan, pp. 48-57, No. 17, vol. 10.

"RSS—Nachrichtendienste für Jedermann" [Langguth], Jan. 2004, University of Jena, retrieved from the Internet URL:http://users.minet.unijena.de/~sack/WS0304/seminar/arbeiten Langguth/ausarb.pdf> on Apr. 22, 2013, Japanese Patent Application No. 2009-541446: Office Action dated Aug. 13, 2013, 4 pages.

European Patent Application No. 07864224.6, Communication dated Jul. 12, 2013, 4 pages.

\* cited by examiner

| Channel Element Title | Channel Element Description | Example |
|---|---|---|
| rssd:dataProvider | Specifies that this RSS stream can be used as an RSSd data provider. | <rssd:dataProvider/> |

20 → (Channel Element Title column)
22 → (Example column)

FIGURE 2

| Column Element Title | Parent Element | Description |
|---|---|---|
| rssd:column | channel | Contains information about the column of data (e.g., stock quote, volume symbol) |

FIGURE 3

| Element | Parent Element | Description | Example |
|---|---|---|---|
| rssd:id | rssd:column | Mandatory This contains the id of the column. | \<rssd:id\> stock_value \</rssd:id\> |
| rssd:title | rssd:column | Optional Contains the title for the column | \<rssd:title\> Stock Value \</rssd:title\> |
| rssd:description | rssd:column | Optional Contains the description for this column. | \<rssd:description\> This column contains the value of the stock. \</rssd:description\> |
| rssd:guid | rssd:column | Optional, Multiple occurrences | |
| rssd:altid | rssd:column | Optional, Multiple occurrences | |

30 → (rssd:id row)
32 → (rssd:title row)
34 → (rssd:description row)
36 → (rssd:guid row)
38 → (rssd:altid row)

FIGURE 4

| Attribute | Description | Example |
|---|---|---|
| xsd:type | Optional<br>Specifies the data type of the column. | \<rssd:column xsd:type="double"\><br>\<rssd:id\><br>stock_value<br>\</RSSDid\><br>\</rssd:column\> |

| Element | Description | Example |
|---|---|---|
| rssd:field | Denotes a field that potentially contains extra information about this item. | `<field>`<br>`<id>stock_value</id>`<br>`<value>27.99</value>`<br>`</field>` |

FIGURE 6

| Element | Parent Element | Description | Example |
|---|---|---|---|
| rssd:id | rssd:field | Mandatory Contains the id of the field. | |
| rssd:value | rssd:field | Optional The actual value of the field. | \<value\> 27.00 \</value\> |

```
<?xml version="1.0" encoding="UTF-8" ?>
<!-- Generator="QuoteRSS.com RSS Stock Quote Feeder" -->
<rss version="2.0">
  <channel>
    <title>QuoteRSS.com: MSFT</title>
    <link>http://www.quoterss.com/quote.php?symbol=MSFT&format=0&uid=1145955243</link>
    <description>Stock Quote for MSFT by QuoteRSS.com</description>
    <language>en-us</language>
    <pubDate>Tue, 25 Apr 2006 01:54:03 -0700</pubDate>
    <lastBuildDate>Tue, 25 Apr 2006 01:54:03 -0700</lastBuildDate>
    <docs>http://feeds.quoterss.comm/docs</docs>
    <generator>QuoteRSS.com RSS News Feed</generator>
    <managingEditor>feed_manager@quoterss.com</managingEditor>
    <webMaster>feed_manager@quoterss.com</webMaster>
            <rssd:column>
                            <rssd:id>stock_value</rssd:id>          }  48
                            <rssd:title>Stock Value</rssd:title>
            </rssd:column>
    <item>
            <title>QuoteRSS.com: MSFT: 27.11 at 4:00pm 4/24/2006</title>
        <link>http://www.quoterss.com/details.php?symbol=MSFT&uid=1145955243</link>
                <description>
<![CDATA[
                        <table border=0 cellspacing=0 cellpadding=1 width="150"><TR><TD
bgcolor="#000000">
<table border=0 cellspacing=0 cellpadding=0 width="100%" class="pq_all">
<TR bgcolor="#DDDDDD"><TD WIDTH=100% ALIGN="CENTER" COLSPAN=2 nowrap><a
href="http://finance.yahoo.com/q?d=t&s=MSFT">MSFT</a> </TD></TR>
<TR bgcolor="#EEEEEE"><TD WIDTH=100% nowrap> Last </TD>
<TD WIDTH=40% nowrap align=right>27.11</TD>
<TR bgcolor="#DDDDDD"><TD WIDTH=100% nowrap> Change </TD>
<TD WIDTH=40% nowrap align=right>0.00 </TD></TR>
<TR bgcolor="#EEEEEE"><TD WIDTH=100% nowrap> % Change </TD>
<TD WIDTH=40% nowrap align=right>0.00% </TD></TR>
<TR bgcolor="#DDDDDD"><TD WIDTH=100% nowrap> Volume </TD>
<TD WIDTH=40% nowrap align=right>0 </TD></TR>
<TR bgcolor="#EEEEEE"><TD WIDTH=100% nowrap> Last </TD>
<TD WIDTH=40% nowrap align=right>4:00pm </TD></TR>
<TR WIDTH=100% HEIGHT=1px nowrap><TD COLSPAN=2 HEIGHT=1px WIDTH=100%></TD></TR>
<!--<TR bgcolor="#DDDDDD"><TD ALIGN=center colspan=3><font class="pq_tiny">PHPQuote
By<br><a href="http://www.booyahmedia.com/"><font color="#555555">BooyahMedia.com</font></a></font></TD></TR>--
>
</TABLE>
</TD></TR></TABLE>
]]>
                </description>
                <pubDate>Tue, 25 Apr 2006 01:54:03 -0700</pubDate>
        <guid>uid=1145955243</guid>
                                            <field>
                                                        <id>stock_value</id>
                                                        <value>27.11</value>
                                            </field>
                            50          <field>
                                                        <id>volume</id>
                                                        <value>0</value>
                                            </field>
    </item>
  </channel>
</rss>
```

REALLY SIMPLE SYNDICATION FOR DATA

TECHNICAL FIELD

The technical field relates generally to computing systems and more specifically to syndicating data via an electronic document in a format compatible with Really Simple Syndication (RSS).

BACKGROUND

Really Simple Syndication, referred to as RSS, is a popular web feed format. RSS is used to collect content from web pages. Users can subscribe to content syndicated via RSS. Users can subscribe to receive an aggregation of content from various web pages. For example, a user could subscribe to receive news from a local news paper that has been retrieved and formatted for publication to the user. This content can be updated periodically. Currently, the kinds of content received via RSS include web page content, such as HTML, links to web pages, and links to digital media. It is not uncommon for a user to utilize RSS to gather content and generate a report incorporating the content. For example, a user can utilize RSS to gather stock market content. If the user wants to incorporate the gathered content in a report, the user typically copies and pastes the content into the report. Copying and pasting can be time consuming, inefficient, and tedious. Copying and pasting can be especially time consuming, inefficient, and tedious if the content includes numbers to be pasted into a spreadsheet or the like. Further, the content being copied and pasted is static, requiring copying and pasting each time the report is to be updated.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

Really Simple Syndication (RSS) is extended to syndicate structured data (e.g., tables of data) as well as general content. Structured data is syndicated via Really Simple Syndication for data (RSSd). Via RSSd, an electronic document containing structured data can be syndicated while maintaining the data structure. The electronic document also can indicate data type. Each RSSd element comprises information allowing a user to obtain the actual data that produced the feed. RSSd provides a user the ability to obtain information that is not present in a standard feed. RSSd provides the ability to syndicate data directly into applications, such as spread sheet applications and the like.

BRIEF DESCRIPTION OF THE DRAWINGS

The foregoing summary, as well as the following detailed description, is better understood when read in conjunction with the appended drawings. For the purpose of illustrating RSS for data (RSSd), there is shown in the drawings exemplary constructions thereof; however, RSSd is not limited to the specific methods and instrumentalities disclosed.

FIG. 8 depicts XML code illustrating RSSd elements incorporated into RSS.

DETAILED DESCRIPTION OF ILLUSTRATIVE EMBODIMENTS

Really Simple Syndication for data (RSSd) makes tables of data easily available to users and across applications. RSSd is backwards compatible with RSS. Elements in RSSd comprise information allowing for structured data to be syndicated. Standardized metadata is utilized in each element of RSSd to enable typing of data. Channel elements of RSSd are extended to include standardized metadata indicating that a stream can be used an RSSd data provider and optionally indicating information about a column of data.

Figure 1:
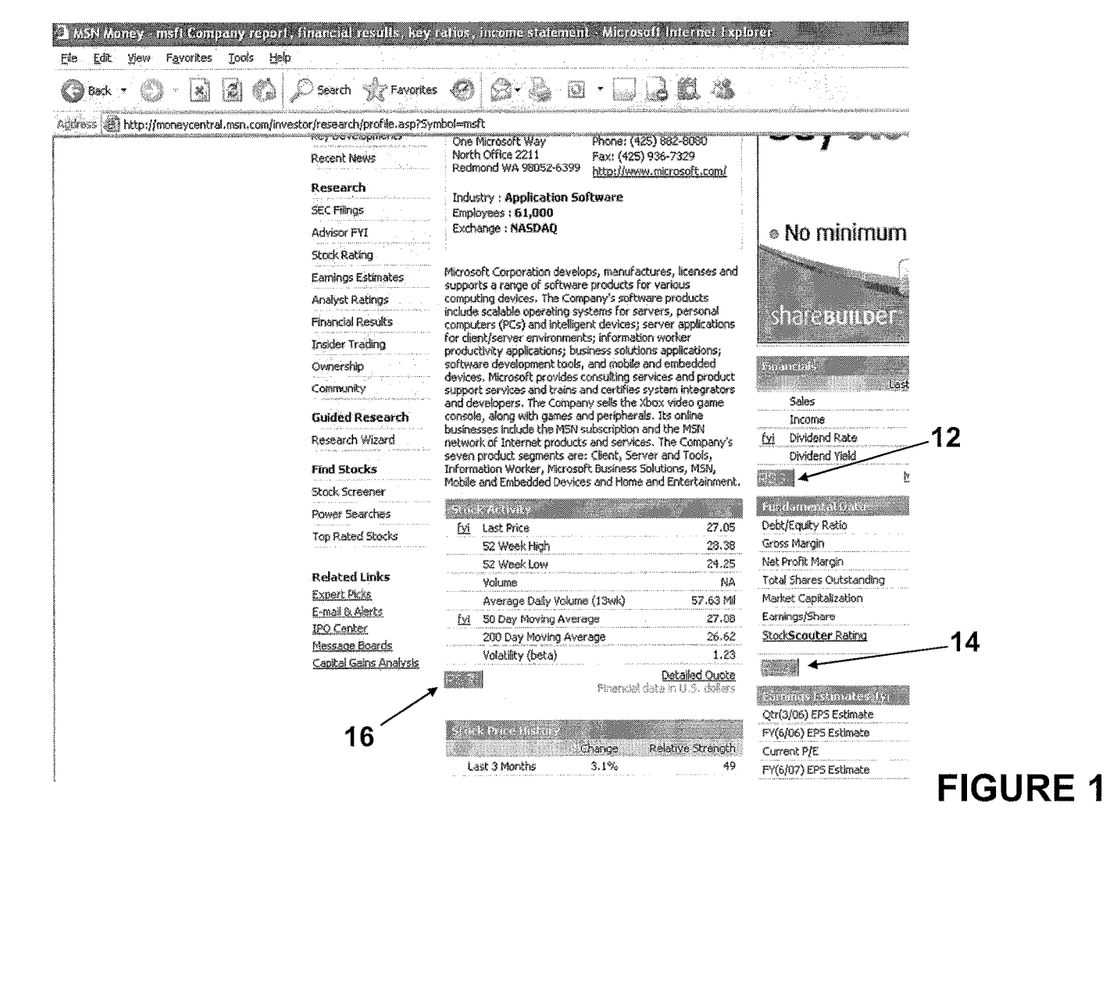
FIG. 1 is an illustrative screen copy of an implementation of RSSd.

FIG. 1 is an illustrative screen copy of an implementation of RSSd. Data can be streamed via RSSd by selecting any of the icons 12, 14, and 16. Selecting an icon 12, 14, 16 will load respective XML formatted code which will be used to feed content from a web page or web pages indicated in the code. The XML formatted code will contain elements allowing structured data, such as tables of date for example, to be fed to a reader and/or aggregator, while maintaining the data type(s) of the structured data. For example, a user can browse the financial web site depicted in FIG. 1. Utilizing RSSd, the user can be fed data and have the data loaded into an application that can utilize tabular and/or free form data, such that the data is current a refreshable. For example, utilizing RSSd, the user can be fed data and have the data loaded into the appropriate cells of a spreadsheet (e.g., EXCEL®). In the application, the user can process the data in accordance with the capabilities of the application. For example the user could analyze the data, perform user-defined calculations on the data, and distribute a report indicating the results of the analysis/processing. Further, the data in the report can be consumed by other users as a live RSSd feed. Each time the application is refreshed, the data in the application can automatically be updated from the financial website via the RSSd feed. Further, downstream users' application can be automatically updated when refreshing their respective applications by consuming the RSSd feed from the first user's application.

RSSd provides end-users and applications live links to refreshable structured data. It enables broad reuse of the structured data in live reports, analysis, and/or applications. Because the data is typed, it is compatible with products that utilize structured data, such as EXCEL® and ACCESS®, for example. Structured data provided via an RSSd feed is also compatible with mash-ups and other data and visualizations tools. Because structured data provided via an RSSd feed is refreshable, the structured data can be automatically updated, thus eliminating the need for manual updates.

Figure 2:
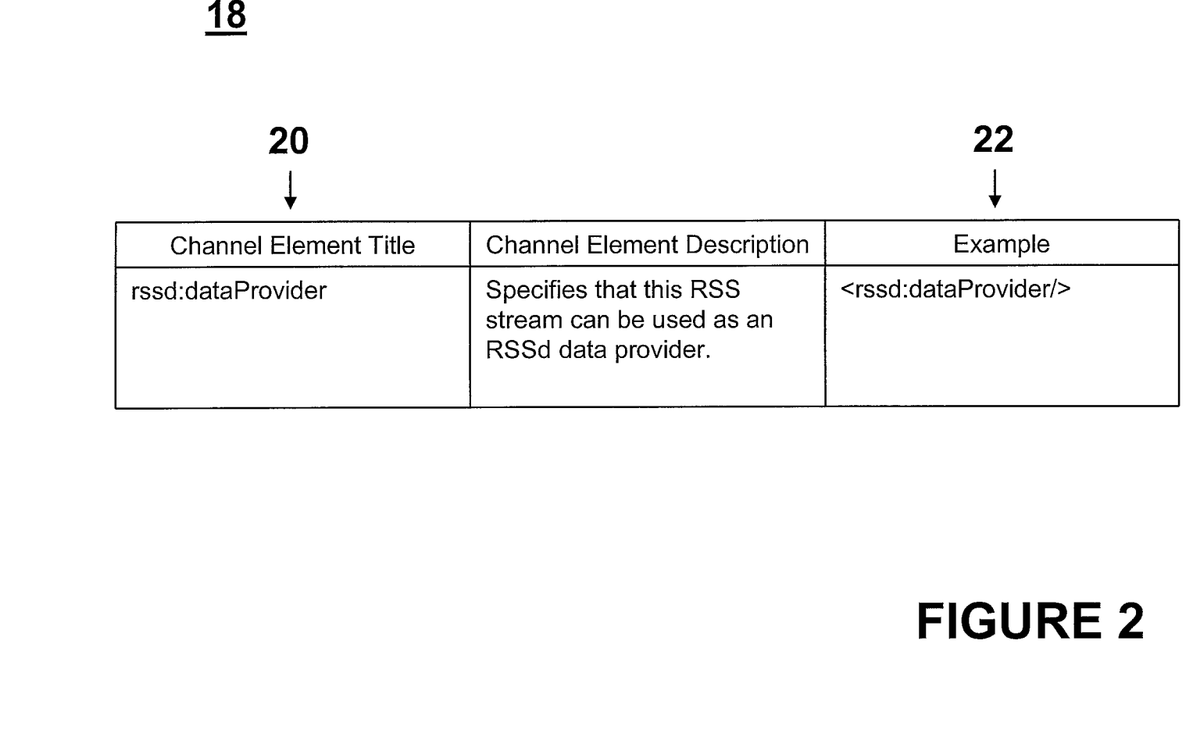
FIG. 2 is a depiction of an example channel element of an RSSd document.

FIG. 2 is a depiction of an example channel element 18 of an RSSd document. To achieve backward compatibility with RSS, RSSd specific elements (elements containing metadata pertaining to data type/structure) are implemented as elements that are optional in RSS. Specifically, in an RSSd document, channel elements are extended to include metadata pertaining to data type/structure. An RSSd channel element 18 contains information about the channel through which information is being fed. The channel element title 20 contains the name of the channel. Users can reference the source of the feed (e.g., a web site) via the title. The channel title 20 is "rssd:dataProvider." In an example embodiment, all RSSd channel elements and sub-elements begin with the prefix "rssd" to indicate that the feed is RSSd compatible. The title "dataprovider" is an example title indicating a generic provider (source) of data. The channel element title 20 indicates that the RSS stream can be used as an RSSd data provider. An example 22 of XML code indicating the channel element title is <rssd:dataProvider/>.

Figure 3:
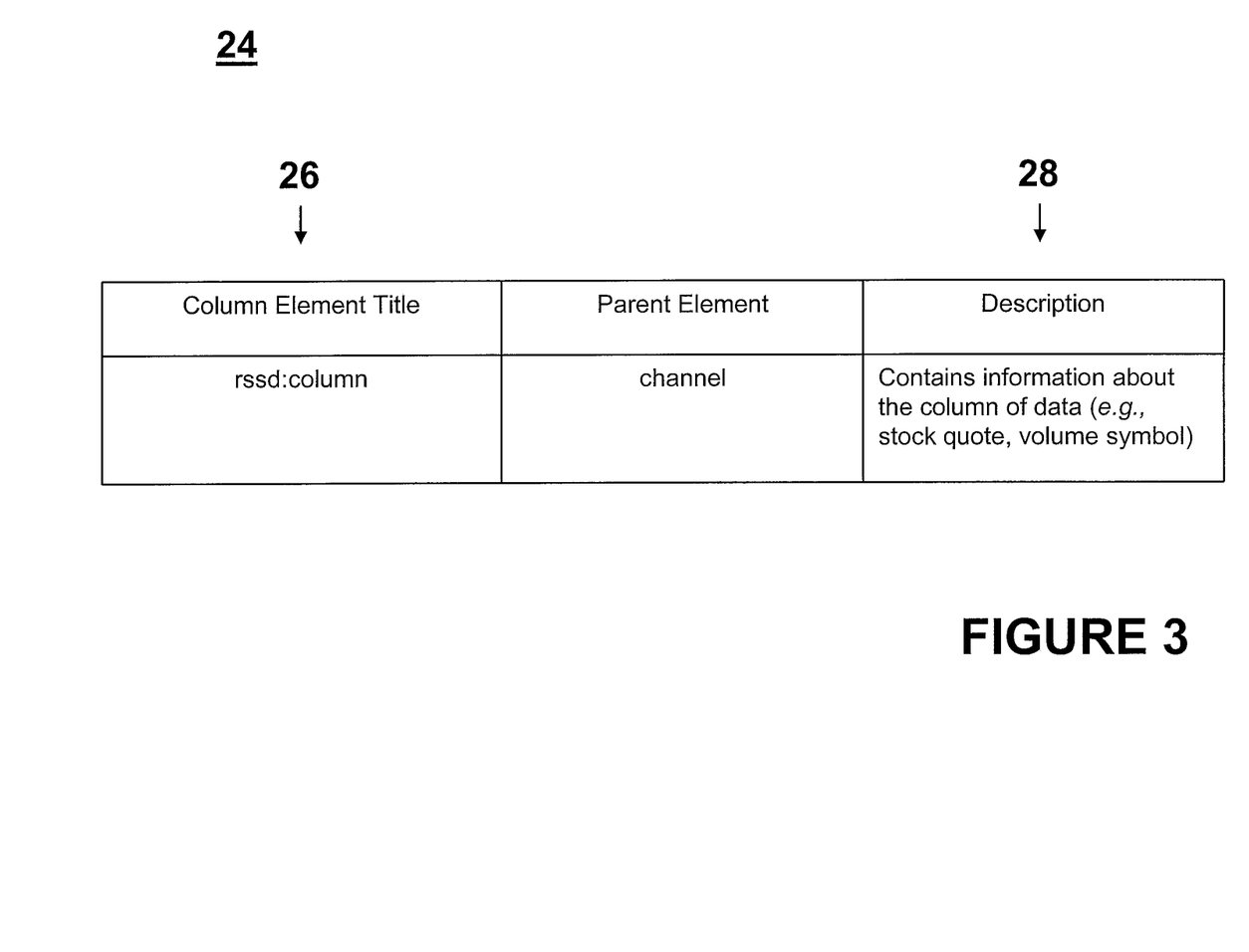
FIG. 3 is a depiction of an example column element of an RSSD document.

FIG. 3 is a depiction of an example column element 24. A channel can comprise RSSd elements, such as a column element or column elements. The column element title 26 contains an indication that the element is a column element. The column title 26 is "rssd:column." In an example embodiment, all RSSd column elements and sub-elements begin with the prefix "rssd" to indicate RSSd compatibility. As shown in FIG. 3, the parent of the column element 24 is the channel element (e.g., channel element 18). The column element description 28 comprises a textual description of the column element. For example, the description sub-element 28 can contain information about column of data such as a stock quote and the volume symbol.

Figure 4:
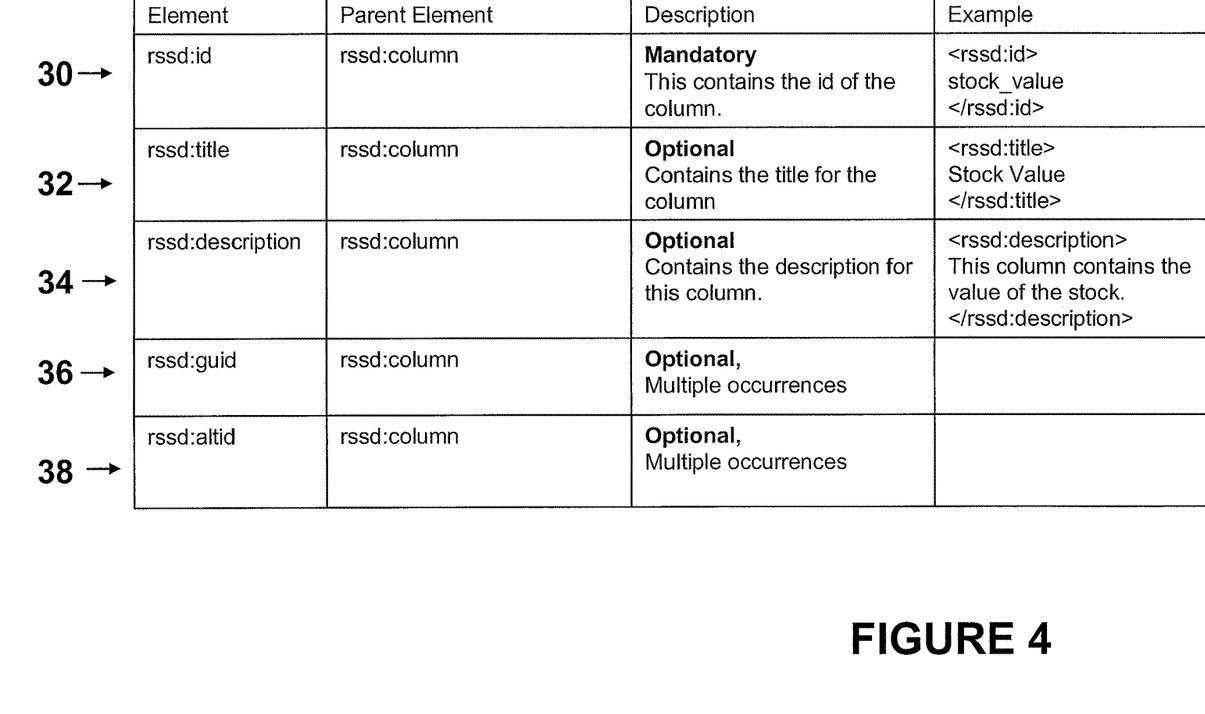
FIG. 4 is a depiction of example items of an RSSd column element.

FIG. 4 is a depiction of example items of an RSSd column element. A column element contains information about a column of data in the feed. A column element contains at least one mandatory item, or sub-element, and can contain various optional items, or sub-elements. Each sub-element, or item, in a column element will have field elements that correspond to published columns. In an example configuration, a mandatory item of an RSSd column element is the ID 30 of the column element. Optional items of an RSSd column element include a title 32 of the column element, a description 34 of the column element, a globally unique identifier, guid, 36 of the column element, and an alternate identifier 38, of the column element.

The ID element 30 is "rssd:id." The "rssd" prefix indicates compatibility with RSSd. The parent element of the ID element 30 is the RSSd column element (e.g., RSSd column element 24). In an example embodiment of RSSd, the ID element 30 is mandatory. The ID element 30 contains an identifier of the RSSd column. Users/authors can reference the ID element 30 when placing values in a field of items. For example, XML formatted code representing the ID element 30 for a stock value could comprise the following:

```
<rssd:id>
stock_value
</rssd:id>
```

The title element 32 is "rssd:title." The "rssd" prefix indicates compatibility with RSSd. The parent element of the title element 32 is the RSSd column element (e.g., RSSd column element 24). In an example embodiment of RSSd, the title element is optional. The title element 32 contains the title for the RSSd column. For example, XML formatted code representing the title element 32 for a stock value could comprise the following:

```
<rssd:title>
Stock Value
</rssd:title>
```

The description element 34 is "rssd:description." The "rssd" prefix indicates compatibility with RSSd. The parent element of the description element 34 is the RSSd column element (e.g., RSSd column element 24). In an example embodiment of RSSd, the description element is optional. The description element 34 contains a description of the RSSd column. For example, XML formatted code representing the description element 32 for a stock value could comprise the following:

```
<rssd:description>
This column contains the value of the stock.
</rssd: description>
```

The guid element 36 is "rssd:guid." The "rssd" prefix indicates compatibility with RSSd. The parent element of the guid element 36 is the RSSd column element (e.g., RSSd column element 24). In an example embodiment of RSSd, the guid element is optional. Various entities can publish "standard" guids for RSSd columns. For example, various industries can have standards as to the meaning of a column, such as how to convert a temperature. Each provider could use its own conversion and/or interpretation, such as converting temperature to degrees Fahrenheit, or degrees Centigrade, for example. The guid element 36 allows a single RSS feed that knows about these published standard columns to support them.

The alternate identifier element 38 is "rssd:altid." The "rssd" prefix indicates compatibility with RSSd. The parent element of the alternate identifier element 38 is the RSSd column element (e.g., RSSd column element 24). In an example embodiment of RSSd, the alternate identifier element is optional. The alternate identifier 38 is a textual identifier. Thus the alternate identifier 38 allows various entities to publish textual identifiers for RSSd columns. The alternate identifier element 38 allows a single RSS feed that knows about these published columns to support them.

Figure 5:
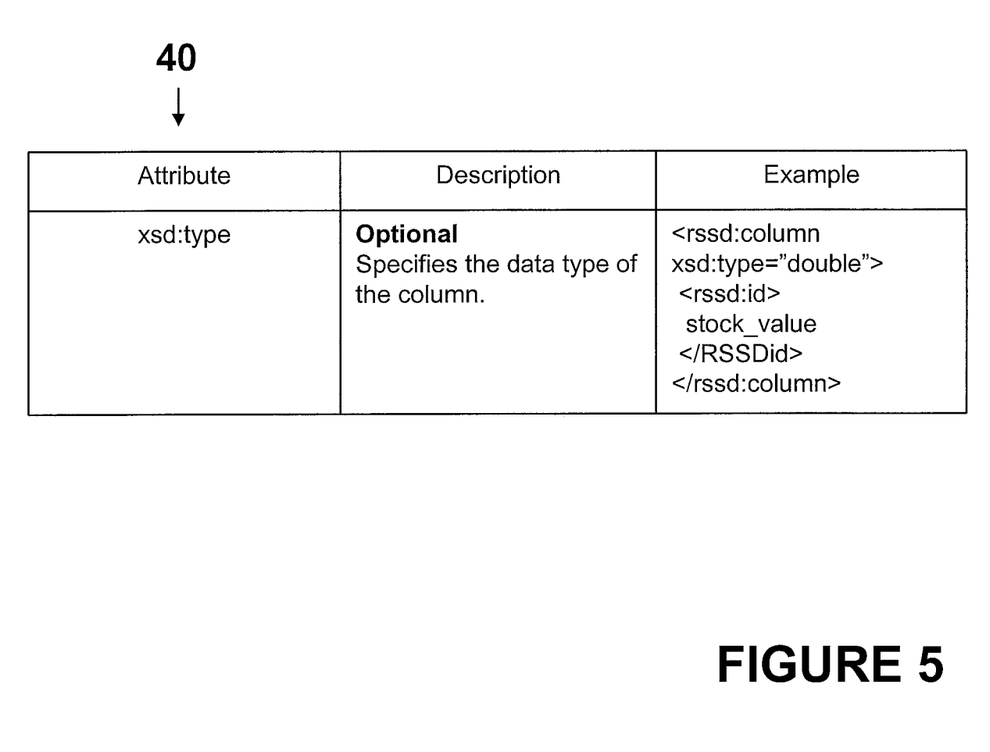
FIG. 5 is a depiction of an example RSSd attribute.

FIG. 5 is a depiction of an example RSSd attribute 40. Data fed via RSSd can be typed in accordance with an attribute associated therewith. The attribute 40 is "xsd:type." The prefix "xsd" indicates the prefix of the standard XML Structured Data namespace. In an example embodiment of RSSd, an attribute is optional. The attribute 40 indicates the type of the data in the column. The attribute 40 can be indicative of any appropriate type indicating a constraint placed on the interpretation of the data in the column. Example appropriated types include records, algebraic data types, tuples, abstract data types, reference types, classes, function types, or the like. For example, XML formatted code indicating that stock value data in the column is a double precision data type could comprise the following:

```
<rssd:column
xsd:type="double">
<rssd:id>
stock_value
</rssd:id>
</rssd:column>
```

Figure 6:
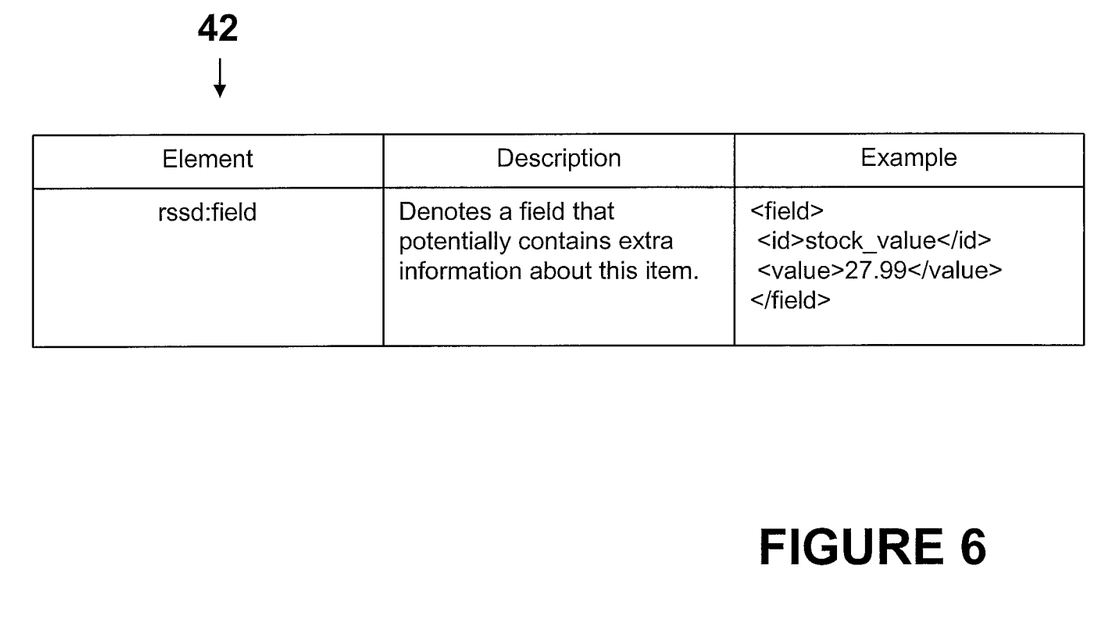
FIG. 6 is a depiction of an example RSSd field element.

FIG. 6 is a depiction of an example RSSd field element 42. To achieve backward compatibility with RSS, each item, or sub-element, in an RSS stream can contain various RSSd field elements. The field element 42 is "rssd:field." The "rssd" prefix indicates that the element belongs to the RSSd namespace (and is thus compatibility with RSSd). Each RSSd field element represents a field for that time. The fields can exist even if a field does not have a corresponding column element. In an example embodiment of RSSd, a field element comprises a mandatory ID element. An example XML formatted code indicating that a value of stock is 27.99 could comprise the following:

```
<field>
    <id>stock_value</id>
    <value>27.99</value>
</field>
```

Figure 7:
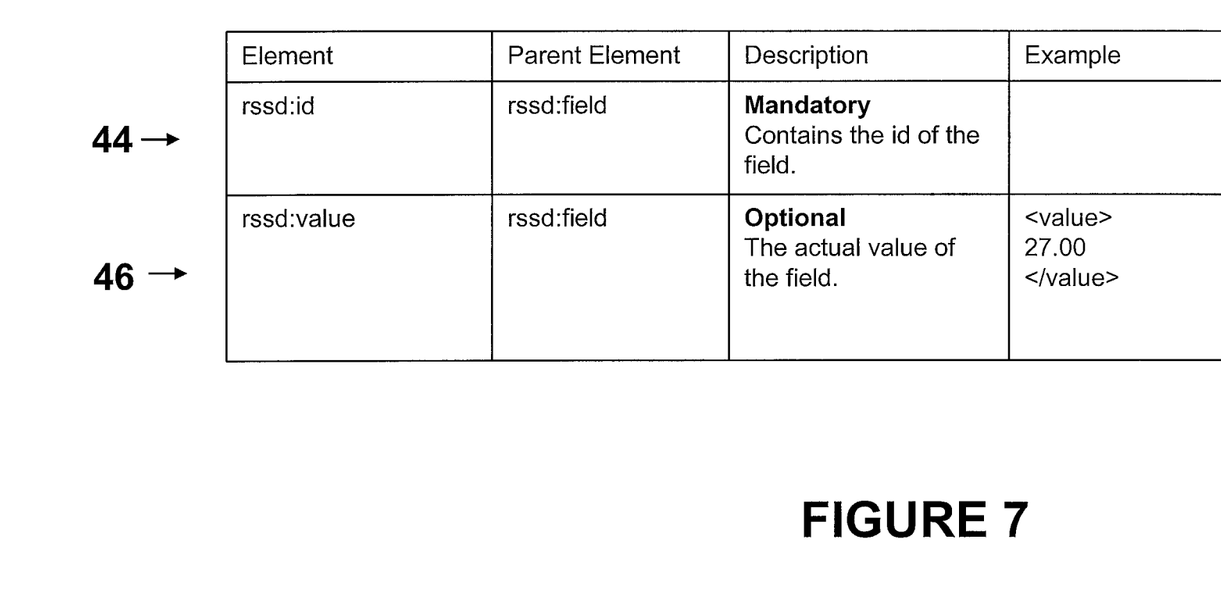
FIG. 7 is a depiction of example sub-elements in an RSSd field element.

FIG. 7 is a depiction of example sub-elements in an RSSd field element. The ID sub-element 44 is "rssd:id." The "rssd" prefix indicates that the element belongs to the RSSd namespace (and is thus compatibility with RSSd). In an example embodiment of RSSD, the ID sub-element of the field element is mandatory. The ID sub-element 44 contains an identifier of the RSSd field. Users/authors can reference an RSSd field by it ID sub-element. In an example embodiment of RSSD, the ID sub-element 44 does not necessarily have to exist in the RSSD column element.

The value sub-element 46 is "rssd:value." The "rssd" prefix indicates compatibility with RSSd. In an example embodiment of RSSD, the value sub-element of the field element is optional. The value sub-element 46 contains the actual value of the field. In an example embodiment of RSSd, if there is an RSSd column element associated with the RSSd ID element, the value must follow the rules of the data-type. An example XML formatted code indicating that a value of stock is 27.00 could comprise the following:

```
<value>
27.00
</value>
```

FIG. 8 depicts XML code illustrating RSSd elements incorporated into RSS. Code segments 48 and 50 are RSSd code segments. Code segment 48 represents an RSSd column having an ID of stock-value and a title of "Stock Value." Code segment 50 represents an RSSd field element having a value of 27.11 and a volume of zero (0).

Figure 9:
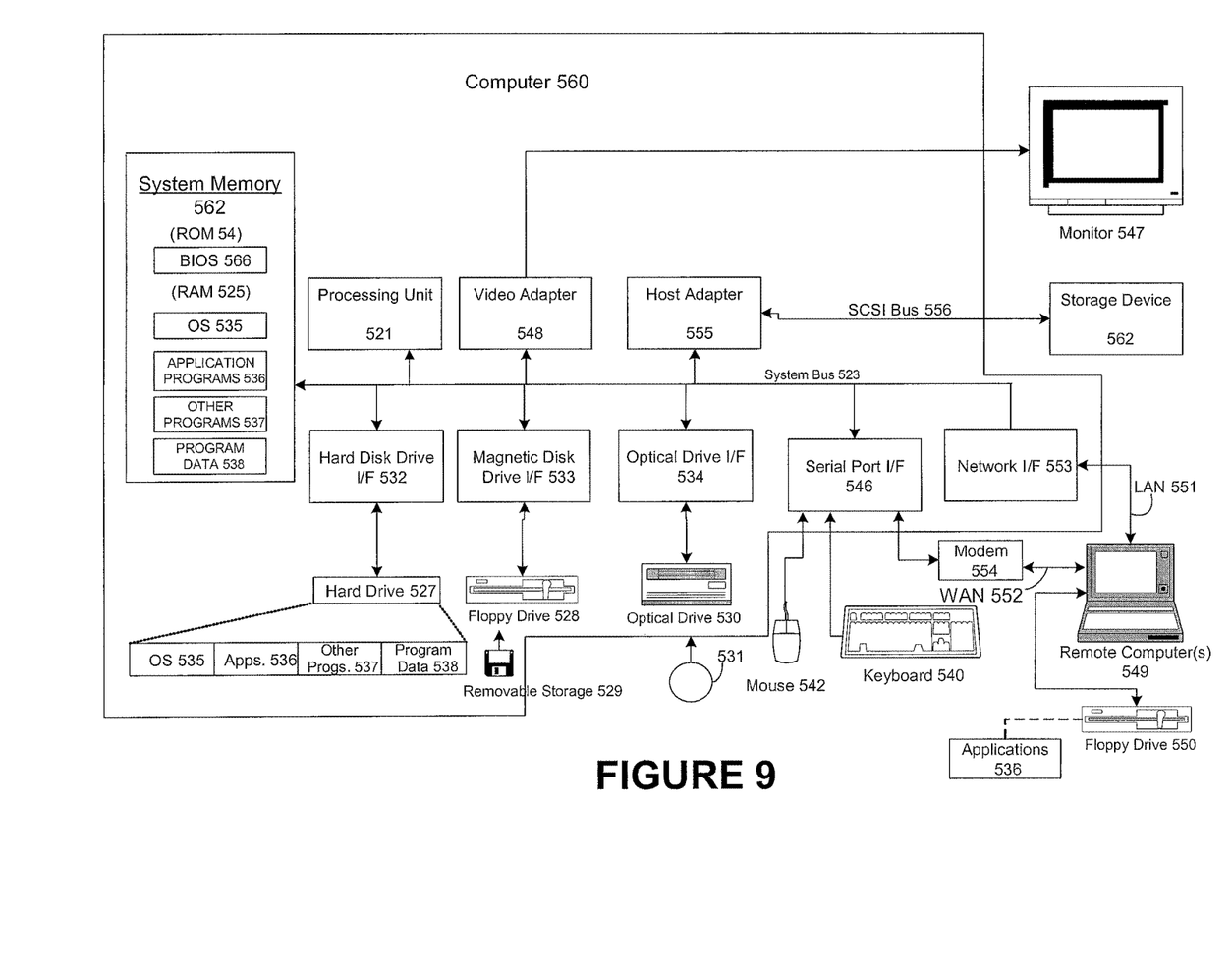
FIG. 9 is a depiction of an example computing environment in which RSSd can be implemented.

FIG. 9 and the following discussion provide a brief general description of a suitable computing environment in which RSSd can be implemented. Although not required, various aspects of RSSd can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of RSSd can be practiced with other computer system configurations, including hand held devices, multi processor systems, microprocessor based or programmable consumer electronics, network PCs, minicomputers, mainframe computers, and the like. Further, RSSd also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 542, a monitor 547, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with RSSd as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 9, an exemplary general purpose computing system includes a conventional computing device 560 or the like, including a processing unit 521, a system memory 562, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read only memory (ROM) 564 and random access memory (RAM) 525. A basic input/output system 566 (BIOS), containing basic routines that help to transfer information between elements within the computing device 560, such as during start up, is stored in ROM 564. The computing device 560 may further include a hard disk drive 527 for reading from and writing to a hard disk (hard disk not shown), a magnetic disk drive 528 (e.g., floppy drive) for reading from or writing to a removable magnetic disk 529 (e.g., floppy disk, removal storage), and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non volatile storage of computer readable instructions, data structures, program modules and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 529, optical disk 531, ROM 564, or RAM 525, including an operating system 535, one or more application programs 536, other program modules 537, and program data 538. A user may enter commands and information into the computing device 560 through input devices such as a keyboard 540 and pointing device 542 (e.g., mouse). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, computing devices typically include other peripheral output devices (not shown), such as speakers and printers. The exemplary environment of FIG. 9 also includes a host adapter 555, Small Computer System Interface (SCSI) bus 556, and an external storage device 562 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 9. The logical connections depicted in FIG. 9 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of RSSd are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing RSSd, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing RSSd.

The program(s) can be implemented in assembly or machine language, if desired. In any case, the language can be a compiled or interpreted language, and combined with hardware implementations. The methods and apparatuses for implementing RSSd also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of RSSd. Additionally, any storage techniques used in connection with RSSd can invariably be a combination of hardware and software.

While RSSd has been described in connection with the example embodiments of the various figures, it is to be understood that other similar embodiments can be used or modifications and additions can be made to the described embodiments for performing the same functions of RSSd without deviating therefrom. Therefore, RSSd as described herein should not be limited to any single embodiment, but rather should be construed in breadth and scope in accordance with the appended claims.

What is claimed:

1. A computer-implemented method comprising:
    receiving an RSS feed containing data items, the data items having a specific tabular structure created at a source of the data items, the specific tabular structure being maintained in code of the RSS feed by computer language elements denoting the specific tabular structure, each computer language element in the RSS feed being identifiable by a predefined prefix;
    automatically generating, in a spreadsheet, the specific tabular structure denoted by the elements; and
    populating the generated specific tabular structure in the spreadsheet with the data items received in the RSS feed.

2. The method of claim 1, further comprising automatically updating the spreadsheet via the RSS feed as additional data items are received in the feed.

3. The method of claim 1, further comprising manipulating the received data items in the spreadsheet without affecting the RSS feed.

4. The method of claim 1, one or more of the computer language elements including an XML element attribute indicative of at least one data type of the structured data items in the RSS feed.

5. The method of claim 4, the at least one data type comprising at least one of a record, an algebraic data type, a tuple, a reference type, a class, and a function type.

6. The method of claim 1, the computer language elements including one or more XML elements indicative of at least one data format of the structured data items in the RSS feed.

7. The method of claim 6, the one or more XML elements indicative of the at least one data format comprising one or more of:
    an RSSd column element; and
    an RSSd item, wherein, the RSSd item further comprises an identifier element indicative of a parent RSSd column element.

8. The method of claim 1, the computer language elements comprising a plurality of XML elements corresponding to different aspects of the structured data items in the RSS feed, each XML element being identifiable in the RSS feed by the predefined prefix.

9. A method comprising:
    receiving a plurality of data items to be transmitted in an RSS feed, the plurality of data items having a specific tabular structure created at a source of the plurality of data items;
    adding XML elements to code of the RSS feed to denote the specific tabular structure of the plurality of data items within the RSS feed, thereby maintaining the specific tabular structure of the plurality of data items during transmission of the plurality of data items while remaining compatible with RSS, each XML element in the RSS feed being identifiable by a predefined prefix; and
    transmitting the RSS feed containing the plurality of data items and XML elements to a subscriber of the RSS feed.

10. The method of claim 9, the XML elements containing attributes indicative of at least one data type of the plurality of data items in the RSS feed.

11. The method of claim 10, the at least one data type comprising at least one of a record, an algebraic data type, a tuple, a reference type, a class, and a function type.

12. The method of claim 9, the XML elements indicative of at least one data format of the plurality of data items in the RSS feed.

13. The method of claim 12, the at least one data format comprising one or more of:
    an RSSd column element; and
    an RSSd item, wherein, the RSSd item further comprises an identifier element indicative of a parent RSSd column element.

14. The method of claim 9, the XML elements corresponding to different aspects of the plurality of data items in the RSS feed.

15. The method of claim 1, wherein the predefined prefix comprises "rssd:".

16. The method of claim 9, wherein the predefined prefix comprises "rssd:".

* * * * *